Figure 2:
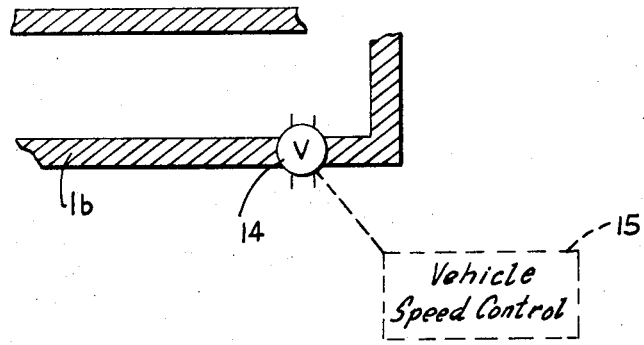

United States Patent [19]
Granig

[11] 3,751,092
[45] Aug. 7, 1973

[54] IMPACT PROTECTOR FOR AUTOMOTIVE VEHICLES

[76] Inventor: Hubert Granig, Thomas-Schmid-Gasse 19, Klagenfurt, Austria

[22] Filed: Nov. 12, 1970

[21] Appl. No.: 88,956

[30] Foreign Application Priority Data
Nov. 14, 1970   Austria ............ 8A 10 697/69, 63c3

[52] U.S. Cl. .................................... 293/73, 293/89
[51] Int. Cl. .......................................... B60r 19/06
[58] Field of Search ...................... 293/1, 9, 24, 60, 293/70, 73, 85, 86, 89, DIG. 2; 267/64 R, 116, 139, 140

[56] References Cited
UNITED STATES PATENTS

| | | | |
|---|---|---|---|
| 1,702,675 | 2/1929 | Ventura | 293/70 |
| 2,628,118 | 2/1953 | Gunnels, Jr. | 293/73 |
| 2,737,301 | 3/1956 | Thornhill | 213/43 |
| 2,873,994 | 2/1959 | Omps | 293/86 |
| 3,215,426 | 11/1965 | Engels | 267/1 |
| 3,286,460 | 11/1966 | Stadler et al | 60/26.11 |
| 3,588,142 | 6/1971 | Gorman | 280/150 |

*Primary Examiner*—Gerald M. Forlenza
*Assistant Examiner*—Robert Saifer
*Attorney*—Ernest G. Montague

[57] ABSTRACT

An impact protector for automotive vehicles, which comprises a bumper bar, and means for varying the distance of the bumper bar from the chassis of the vehicle. The distance varying means include means providing a pressurized gas. At least one hydraulic, telescopic piston-cylinder unit having a first chamber which receives a pressure liquid and includes a working chamber in an operative condition, and the pressure liquid is adapted to be pressed into the working chamber by the pressurized gas and operates by expanding the piston-cylinder unit. The protector remains then in an inoperative collapsed position during normal vehicle operation.

10 Claims, 3 Drawing Figures

PATENTED AUG 7 1973 3,751,092

INVENTOR
Hubert Granig
BY
ATTORNEY

IMPACT PROTECTOR FOR AUTOMOTIVE VEHICLES

The present invention relates to an impact protector for automotive vehicles, in general, and to such an impact protector for the protection of the passengers of the vehicle including an outward movable bumper bar which moves out in case of an imminent obstacle by means of one or a plurality of hydraulic telescope-like piston-cylinder devices, in particular.

In the co-pending Pat. application, Ser. No. 796,395, filed Feb. 4, 1969, the same inventor disclosed a device for protection against impact accidents involving a motor vehicle, which device comprises a bumper bar and piston-cylinder means connected thereto. Gas supplying means are provided for supplying compressed gas to the piston-cylinder means, which are adapted to respond to the supply of gas and also venting means are provided for venting the piston-cylinder means.

It is one object of the present invention to provide an impact protector which constitutes a further improvement of the device of said co-pending patent application.

It is another object of the present invention to provide an impact protector, wherein the liquid of a hydraulic telescoping device is pressed preferably only at the moment of an impact, by means of an expanding gas, for example, from an ignited cartridge, a pressurized air container, or the like into the working chamber of the hydraulic telescoping device, whereby the latter with the bumper bar is moved out. From the working chamber the liquid can escape, upon compression of the telescoping device, through one or a plurality of openings and valves, respectively, or safety valves, which can be adjusted in response to the vehicle speed. By such arrangement, work is performed and the moving energy of the vehicle is consumed.

The liquid is pressed by the compression of the telescoping device preferably again into the container, for example, into the part of the telescoping device which is movable outwardly.

Figure 1:
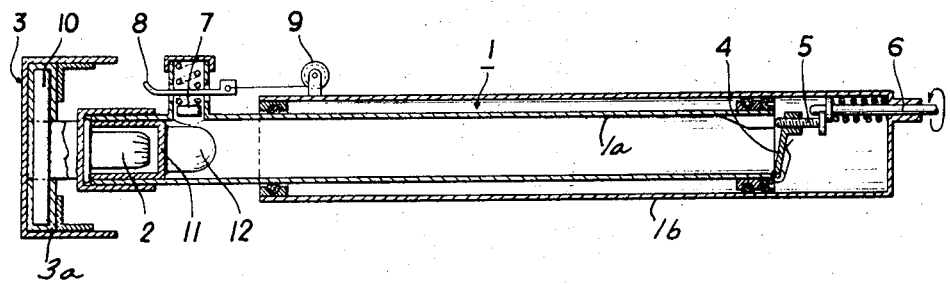
Figure 3:
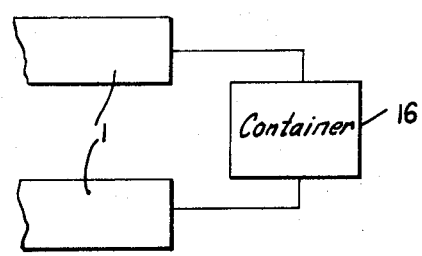

With these and other objects in view which will become apparent in the following detailed description, which will be clearly understood in connection with the accompanying drawing, in which:

FIG. 1 discloses schematically a longitudinal section of the device of the present invention;

FIG. 2 is a broken away section of the outer part of the device showing a valve controlled by the vehicle speed; and FIG. 3 is a schematic fragmentary top plan view showing a container disposed between two telescopic devices.

Referring now to the drawing, the device of the present invention comprises a telescoping device 1 which comprises an outwardly moving inner part 1a and an outer part 1b rigidly connected with the vehicle. The drawing discloses the protector with the inner part withdrawn into its outer part.

The inner chamber of the telescoping device 1 is filled with a liquid, for example, oil or water safe against freezing. A member such as a cartridge 2, a pressurized air container, or the like is disposed at the forward end of the telescoping device 1, which member provides the expanding pressurized gas for the pressure application to a piston 11 which compresses the liquid. A flap 4 closes the inner part of the telescoping device 1 except for a slit set by a screw bolt 5. A safety valve 7 is arranged near the front end of the inner part of the telescoping device 1 and the pressurized gas escapes through the safety valve 7 after the inner part has moved out. An arresting member 8 of the safety valve 7 is released by a cable, after moving for a predetermined travelling path of the inner part of the telescoping device, which cable is wound over a roller 9.

A bumper bar 3 is secured to the telescoping device 1 by means of a bolt 10, preferably laterally displaceable in guides 3a against a predetermined resistance.

The device of the present invention starts its operation upon ignition and release, respectively, of the cartridge 2. This ignition or release can take place at will, for example, by operation of a switch by the driver of the vehicle or automatically. This automatic actuation may be done, for example, upon impact of an abutment member, in front of the vehicle during its travelling operation, the bumper being moved out by means of a telescoping member abutting against an obstacle. The ignition or release of the cartridge 2 takes place in known manner mechanically or electrically. The expanding gas exerts now a pressure upon the piston 11, and in this case the latter presses upon the liquid in the telescoping device. The liquid in the inner part of the telescoping device 1 escapes thereby through the widely opening flap 4 into the outer part of the telescoping device 1, whereby the inner part thereof together with the bumper bar 3 are moved, the bumper bar 3 being disposed at the front end of the automotive vehicle.

For damping the impact during the moving out, for example, an air-filled rubber container 12 can be secured as a damping member on the piston 11, which permits also a limiting retarding path of the telescoping device 1 in its moved-in position.

Upon reaching a predetermined moving length, for example, shortly prior to the end of the moving out path, the arresting member 8 of the safety valve 7 is released by the cable, which has been completely wound off the roller 9 and the pressured gas escapes from the inner part of the telescoping device 1, however, not completely. A predetermined pressure is preferably maintained, so that the telescoping device 1 is again moved out for a full length, if the vehicle did not come to a standstill at an obstacle. This can be provided by adjustment of the valve, 7 so that the total gas pressure is reduced. It is also possible to provide an ordinary valve without pressure setting or merely an opening in the inner part of the telescoping device 1. It is important only, that the gas pressure in the inner part after compression of the telescoping device 1 by the impact of the vehicle against an obstacle is not so strong, as to cause, for example, for the vehicle passengers, a damaging rebound of the bumper bar.

After moving out of the bumper bar, the latter abuts against the obstacle, whereby the telescoping device 1 is compressed. The flap 4 which may possibly be supported by a spring, again closes the inner part of the telescoping device 1, except for a small slit controlled by the screw bolt 5.

The screw bolt 5 is adjusted, for example, by an axially displaceable shaft 6, which is operatively connected with the tachometer (not shown) of the vehicle, which adjustment is dependent upon the prevailing vehicle speed. The retarding of the passage takes place to an extent, that the moving energy of the vehicle different in dependency of the speed is consumed on the available retarding path of the telescoping device 1.

The flap can, of course, carry a valve (not shown) controlling the passage.

Such a valve 14 controllable by the vehicle speed 15 can be provided also on the outer part of the telescoping device 1. Applicants' copending application Ser. No. 796,395 filed Feb. 14, 1969 shows such a speed controlled valve. In this case the liquid flows, for example, into rubber containers provided on the outside or into a damper.

The chamber, in which the liquid is disposed in the resting position of the telescoping device 1 can be arranged also outwardly, by example, forwardly on or in the bumper bar or in a connecting container 16 between, for example, two adjacent telescoping devices 1 at the rear end thereof. The expanding gas presses the liquid from the containers into the working chamber of the telescoping device 1, which can consist also of more than two sliding parts.

While I have disclosed several embodiments of the present invention, it is to be understood that these embodiments are given by example only and not in a limiting sense.

I claim:

1. An impact protector for automotive vehicles comprising
   a bumper bar,
   means for varying the distance of said bumper bar from the chassis of the vehicle,
   said distance varying means including means for providing a pressurized gas,
   at least one hydrualic, telescopic piston-cylinder unit having a first chamber receiving a pressure liquid and including a working chamber, and said first chamber operatively communicating with said working chamber, said pressure liquid being operatively pressed into said working chamber in an operative condition by said pressurized gas and operatively expanding said piston-cylinder unit,
   said protector remaining in an inoperative collapsed position during normal vehicle operation,
   said piston-cylinder unit comprises an inner part defining an inner chamber constituting said first chamber and an outer part,
   said inner part being filled with said pressure liquid in the collapsed position constituting a moved-in position,
   said means for providing a pressurized gas is provided at the forward end of said inner part,
   a swingable flap secured to said inner part at the rear end of said inner part,
   said flap opening widely by the effect of the stream of said pressure liquid upon a moving out of said inner part relative to said outer part and closing up to a split upon compression of said unit, and
   a set screw operatively connected to said flap and controlled by a speedometer of the vehicle for adjusting the width of said split in dependency upon the vehicle speed, whereby the flowing resistance occurring in said split determines the resistance force of said protector in accordance with the length of the available retarding path and the vehicle speed.

2. The impact protector, as set forth in claim 1, which includes
   valves on said outer part controllable by the vehicle speed and determining the resistance force of said protector, and said liquid being fed off by said valves.

3. The impact protector, as set forth in claim 1, which includes
   an arresting member disposed on a forward portion of said inner part and operatively connected with a safety valve means on said inner part,
   a cable wound on a roller releasing said arresting member for actuating said safety valve means upon reaching a predetermined expanded position during moving out of said inner part.

4. An impact protector for automotive vehicles comprising
   a bumper bar,
   means for varying the distance of said bumper bar from the chassis of the vehicle,
   said distance varying means including means for providing a pressurized gas,
   at least one hydraulic, telescopic piston-cylinder unit having a first chamber receiving a pressure liquid and including a working chamber, and said first chamber operatively communicating with said working chamber, said pressure liquid being operatively pressed into said working chamber in an operative condition by said pressurized gas and operatively expanding said piston-cylinder unit,
   said protector remaining in an inoperative collapsed position during normal vehicle operation,
   said means for providing a pressurized gas comprises an ignitable cartridge, and
   a separating member is disposed between said liquid in said working chamber and said cartridge.

5. An impact protector for for providing vehicles comprising
   a bumper bar,
   means for varying the distance of said bumper bar from the chassis of the vehicle,
   said distance varying means including means for providing a pressurized gas,
   at least one hydraulic, telescopic piston-cylinder unit having a first chamber receiving a pressure liquid and including a working chamber, and said first chamber operatively communicating with said working chamber, said pressure liquid being operatively pressed into said working chamber in an operative condition by said pressurized gas and operatively expanding said piston-cylinder unit,
   said protector remaining in an inoperative collapsed position during normal vehicle operation,
   a separating member disposed between said liquid in said working chamber and said means for providing a pressurized gas, and
   a compressible member provided on said separating member in order to permit an additional telescopic collapsing movement of said piston-cylinder unit.

6. The impact protector, as set forth in claim 1, which includes
   a container for receiving said liquid for feeding said liquid into said inner part by said pressurized gas.

7. The impact protector, as set forth in claim 6 which includes
   at least two adjacent telescoping devices, and
   said container is disposed between said telescoping devices.

8. The impact protector, as set forth in claim 1, which includes
a pin connecting said bumper bar with said unit,
guide means for said pin provided on said bumper bar,
said pin being laterally displaceable.

9. An impact protector for automotive vehicles comprising
a bumper bar,
means for varying the distance of said bumper bar from the chassis of the vehicle,
said distance varying means including means for providing a pressurized gas,
at least one hydraulic, telescopic piston-cylinder unit having a first chamber receiving a pressure liquid and including a working chamber, and said first chamber operatively communicating with said working chamber, said pressure liquid being operatively pressed into said working chamber in an operative condition by said pressurized gas and operatively expanding said piston-cylinder unit,
said protector remaining in an inoperative collapsed position during normal vehicle operation,
a swingable flap means secured to said piston-cylinder unit between said first chamber and said working chamber for opening widely by the effect of the stream of said pressure liquid upon an expansion of said telescopic piston-cylinder unit and closing up to a gap upon a telescopic compression of said piston-cylinder unit,
a separating member disposed between said liquid in said working chamber and said means for providing a pressurized gas, and
a set screw operatively connected to said flap means and being controlled by a speedometer of the vehicle for adjusting the width of said gap in dependency of the vehicle speed.

10. An impact protector for automotive vehicles comprising
a bumper bar,
means for varying the distance of said bumper bar from the chassis of the vehicle,
said distance varying means including means for providing a pressurized gas,
at least one hydraulic, telescopic piston-cylinder unit having a first chamber receing a pressure liquid and including a working chamber, and said first chamber operatively communicating with said working chamber, said pressure liquid being operatively pressed into said working chamber in an operative condition by said pressurized gas and operatively expanding said piston-cylinder unit,
said protector remaining in an inoperative collapsed position during normal vehicle operation,
a swingable flap means secured to said piston-cylinder unit between said first chamber and said working chamber for opening widely by the effect of the stream of said pressure liquid upon an expansion of said telescopic piston-cylinder unit and closing up to a gap upon a telescopic compression of said piston-cylinder unit.

* * * * *

UNITED STATES PATENT OFFICE
CERTIFICATE OF CORRECTION

Patent No. 3,751,092　　　　　　　　Dated　August 7, 1973

Inventor(s) HUBERT GRANIG

It is certified that error appears in the above-identified patent and that said Letters Patent are hereby corrected as shown below:

On the cover sheet, [30], "Nov. 14, 1970" should read -- Nov. 14, 1969 -- .

Signed and sealed this 13th day of August 1974.

(SEAL)
Attest:

McCOY M. GIBSON, JR.　　　　　　　C. MARSHALL DANN
Attesting Officer　　　　　　　　　Commissioner of Patents